(12) United States Patent
Sharkey

(10) Patent No.: US 11,352,205 B2
(45) Date of Patent: Jun. 7, 2022

(54) DEBRIS COLLECTION AND PORTAGE SYSTEM

(71) Applicant: Phelan Sharkey, Voluntown, CT (US)

(72) Inventor: Phelan Sharkey, Voluntown, CT (US)

( * ) Notice: Subject to any disclaimer, the term of this patent is extended or adjusted under 35 U.S.C. 154(b) by 63 days.

(21) Appl. No.: 16/664,863

(22) Filed: Oct. 27, 2019

(65) Prior Publication Data

US 2021/0051862 A1 Feb. 25, 2021

Related U.S. Application Data

(60) Provisional application No. 62/755,511, filed on Nov. 4, 2018.

(51) Int. Cl.
    *B65F 1/14* (2006.01)
    *A01G 20/43* (2018.01)
    *B65F 1/00* (2006.01)

(52) U.S. Cl.
    CPC ............ *B65F 1/1473* (2013.01); *A01G 20/43* (2018.02); *B65F 1/0006* (2013.01)

(58) Field of Classification Search
    CPC .... B65F 1/1468; B65F 1/1473; B65F 1/0006; A01G 20/43
    USPC ................................ 383/4, 6, 15; 5/417–420
    See application file for complete search history.

(56) References Cited

U.S. PATENT DOCUMENTS

| 5,529,321 | A | 6/1996 | Thompson |
| 9,232,699 | B1 | 1/2016 | Tosto |
| 9,992,938 | B2 | 6/2018 | Farrer et al. |
| 2007/0183689 | A1* | 8/2007 | Leone ............... B65D 33/16 383/17 |
| 2010/0008601 | A1* | 1/2010 | Prudencio ............ A01G 20/40 383/4 |
| 2013/0195383 | A1* | 8/2013 | Daugs, Jr. ............ A01G 20/43 383/12 |

FOREIGN PATENT DOCUMENTS

GB 176862 A * 3/1922

* cited by examiner

*Primary Examiner* — Jes F Pascua
(74) *Attorney, Agent, or Firm* — Jole Douglas

(57) ABSTRACT

According to an aspect, an apparatus is provided that is capable of providing debris collection and portage. The apparatus includes handles and tarp devices which can be used to handle yard waste.

14 Claims, 16 Drawing Sheets

DEBRIS COLLECTION AND PORTAGE SYSTEM

BACKGROUND

The present disclosure relates generally to debris containment, and more specifically, to the collection and portage of indoor and/or outdoor debris.

Methods of managing outdoor cleanup of organic debris (e.g., leaves, acorns, sticks, etc.), as well as inorganic debris (such as plastics, glass, and various metal objects), have evolved over time from manual processes using traditional garden rakes to collect various types of organic debris into one or more locations, which organic debris may be then burned in accordance with local permits, while the inorganic materials are separated out and discarded. More recent methods of clean up include power equipment, such as gas- or electric-powered leaf blowers as well as mowers designed to mulch the inorganic materials back into the soil.

Power tools can be a costly alternative to the above-referenced traditional methods. In addition, these tools still require the added manual process of removing heavy and certain inorganic debris in the cleanup process.

Another solution in outdoor debris cleanup involves ground cover material that is laid flat on the ground and debris is raked over the material, which is then dragged or carried away to an off-loading location for disposal. This ground cover material can be difficult to manipulate as the load thereon increases. For example, light weight leaves and debris that are collected onto the cover can be blown away or carried off by wind or simply fall off when one end of the material is lifted in an attempt to transport or relocate the collection of debris. Moreover, the material itself can be difficult to manage and control based on factors of weight and composition. For example, a relatively lightweight cover can be easily lifted, disheveled, and/or tangled by weather conditions, thereby hindering the debris collection and/or portage efforts.

What is needed, therefore, is a debris collection and portage apparatus that is resistant to weather-related movement and provides secure containing of its load before and during the collection process, as well as secure containment during transport.

SUMMARY

Embodiments include a debris collection and portage apparatus for debris collection and portage. An embodiment of the apparatus includes {Phelan, the Summary mirrors the independent claim (claim 1) but written in plain English. I will provide the Summary once we have agreed on the claims}.

Embodiments further include a method of manufacturing a debris collection and portage apparatus. An embodiment of the method includes {Phelan, the Summary mirrors the independent claim (claim 1) but written in plain English. I will provide the Summary once we have agreed on the claims}.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 6A depicts the opposing interlocking hook of the invention.

FIG. 10A depicts the wheels to the invention shown from the right-side view.

DETAILED DESCRIPTION

Embodiments described herein can be utilized for the containment and portage of organic and/or inorganic debris. The debris collection and portage apparatus enable an end user or consumer to collect debris over the apparatus, interlock desired portions of the apparatus, and create a unified handle for convenient transport of the debris. The interlock properties of the apparatus further enable easy and convenient storage of the apparatus.

The instant invention can also include embodiments which provide the following features:

A magnetic interlocking handles

A dust pan style edged liner around perimeter

A clip-on handles which attached to pre-formed eyes in the tarp

A reinforced "bumper/edge" to avoid tearing holes in tarp

A weighted tension load reader on handles

Weights integrated into the tarp and to provide resistance to "wind flop"

Heavy duty Velcro center seam so you can envelope a standing tree and prune

Anti-Rip Material

Utility/lawn tractor hook up capability to allow the tarp to be dragged with a vehicle Commercial sized zipper lined sides, long and short ways to seal up load Distinguished top leaf/debris side and bottom bumper sliding side The instant invention can comprise of 4 handles designed to interlock so that the 4 handles can form 2 handles and then ultimately be configured to form a single quad stacked interlocked handle for storage or lifting.

The instant invention can comprise of a shoulder sling attached to the tarp to facilitate transport of the tarp and load allowing hands free conveyance to the work site.

The instant invention can comprise of dolly wheels configured to support the tarp for transporting the loaded tarp.

The prior art describes a number of Tarp related inventions such as U.S. Pat. Nos. 9,232,699, 9,992,938 and 5,529,321 the disclosures of these patents are herein incorporated by reference.

Figure 1:
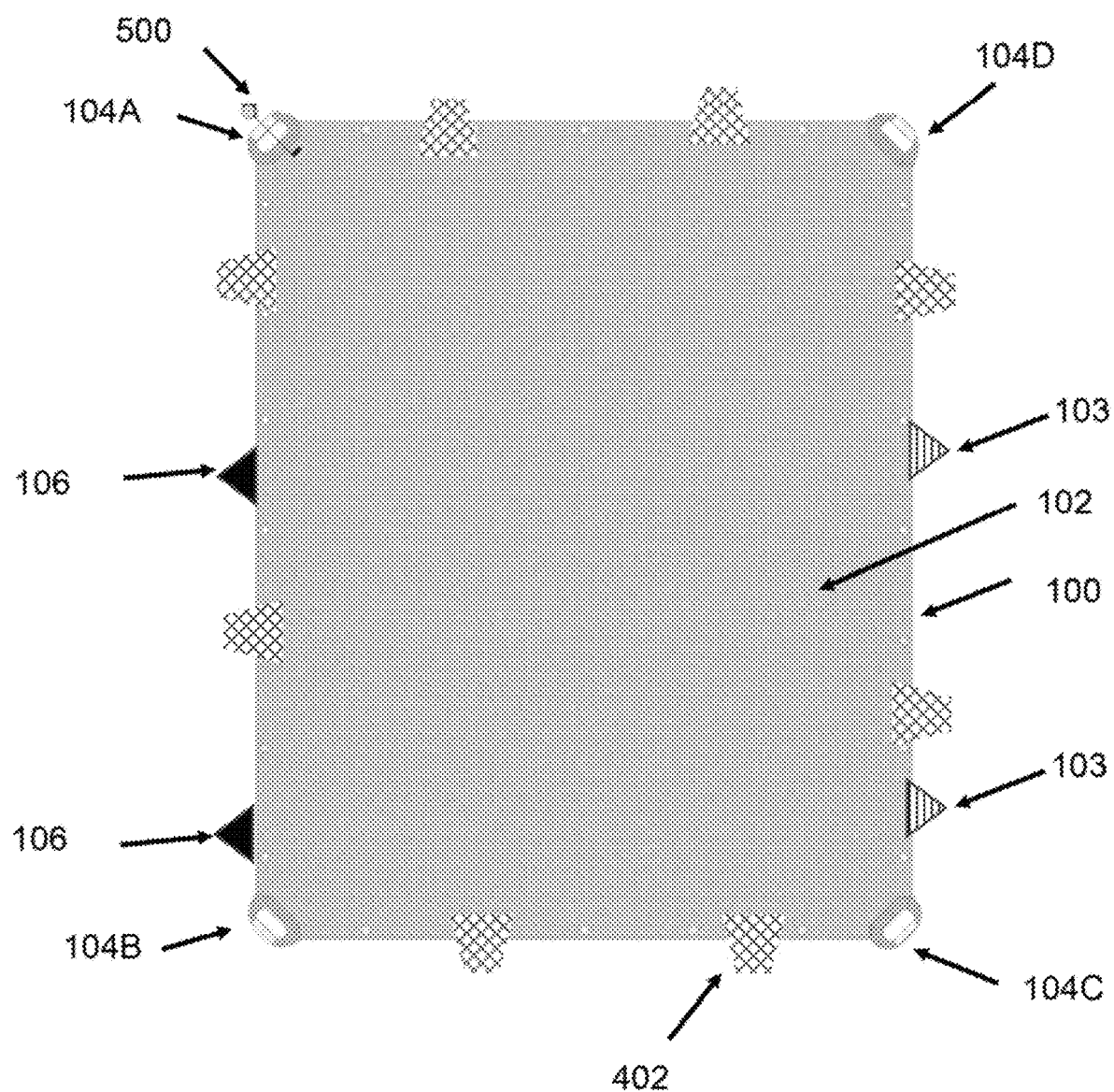
FIG. 1 depict high-level plan views of a debris collection and portage apparatus in accordance with an embodiment.

Referring now to FIG. 1, 2, a high-level planar view of an apparatus 100 for debris collection and portage is generally shown in accordance with an embodiment. The apparatus 100 includes a weather-resistant cloth 102 and four handles 104A-104D (also referred to herein as gripping handles, and collectively, gripping handles 104), each of which is affixed to a respective corner of the cloth 102. However, the apparatus 100 can also be a 3, 4, 5, or 6 cornered configuration. The preferred embodiment is a 4 cornered embodiment. In an embodiment, the weather-resistant cloth 102 is of a substantially rectangular, triangular, pentagon or hexagon in shape but the preferred embodiment is a 4-side shape though it will be understood by one of ordinary skill in the art that other shapes may be employed to realize the advantages of the embodiments described herein. The weather-resistant cloth 102 is comprised of a durable but lightweight and flexible material such as woven polyester or canvas which is capable of being folded lengthwise along a longitudinal axis and widthwise along the width axis. However, the instant invention can be used with any durable sheet material or weather-resistant cloth. Magnetic materials 103 and 106 can communicate with each other when the cloth 102 is fold lengthwise and hold the cloth 102 closed.

In an embodiment, the weather-resistant cloth may range in size from 4 feet to about 26 feet width and from 6 feet to about 30 feet height.

Figure 2:
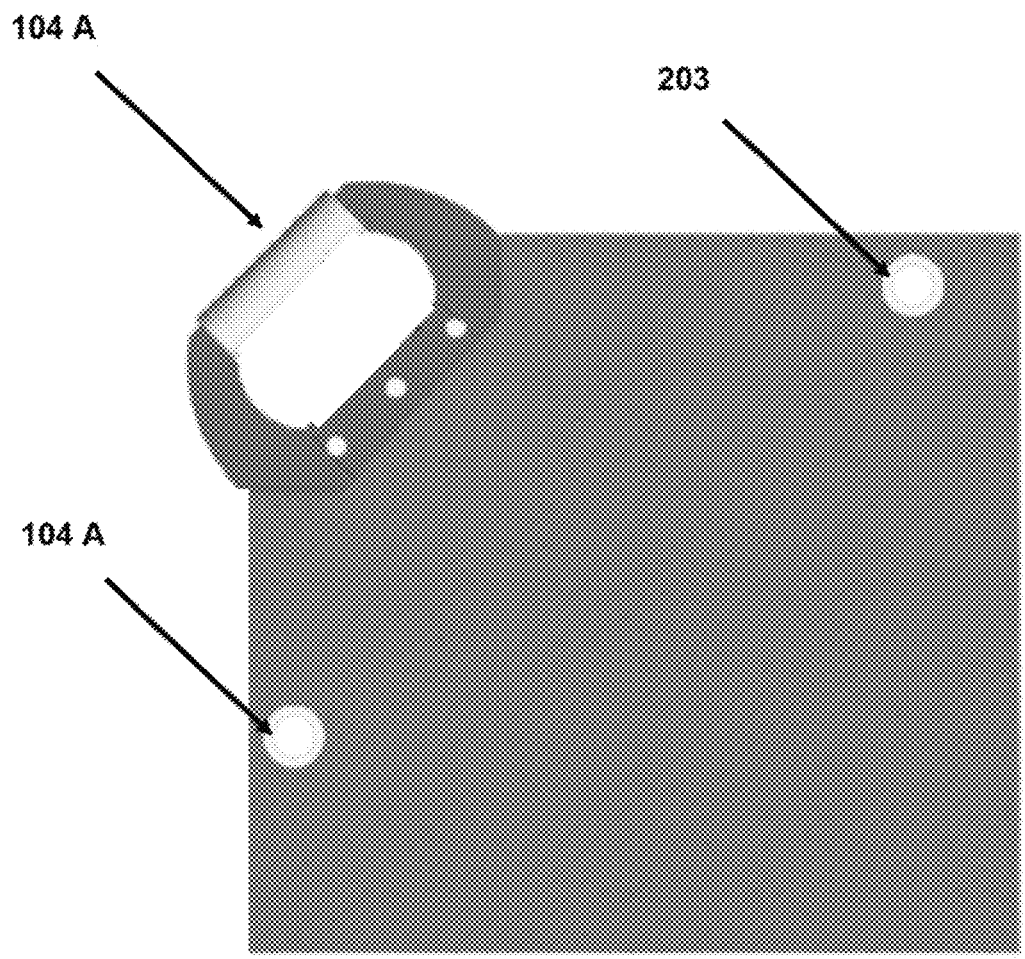
FIG. 2 depicts a plan view of a gripping handle in accordance with an embodiment.

As shown in FIGS. 1 and 2, corners of the weather-resistant cloth are cut at an approximate 45-degree angle. In an embodiment the gripping handles 104 A-D may be configured to have a width that corresponds in size to the width of the corresponding cut in the cloth 102. The angled corners enable easy attachment of the gripping handles to the corners of the cloth. In an embodiment, the gripping handles 104 A-D are affixed to the weather-resistant cloth 102 using stitching, bolts, tie wraps and/or rivets. In other embodiments, the handles can be attached to the weather-resistant cloth by using an adhesive material such as an epoxy or Cyanoacrylates. Alternatively, the handles 104 A-D can be clipped to the cloth 102 using a clip as described in U.S. Pat. No. 9,992,938 or other similar device which can be removably attached to the tarp. The handles can also be constructed with load measuring spring indicator or load cell type of indicator to allow the user to measure the weight of the loaded apparatus 100 for debris collection and portage. This is particularly useful when the material being transported fees are based on the weight of the material in the tarp. Also shown in FIG. 2 is pre-installed eyes 203 which are attached to weather-resistant cloth 102. The eyes/grommets 203 can be attached to the weather-resistant cloth 102 as required to provide a method of securing the weather-resistant cloth 102 to a transportation device such as a truck or trailer. They can be made from aluminum, steel or stainless steel.

Figure 3:
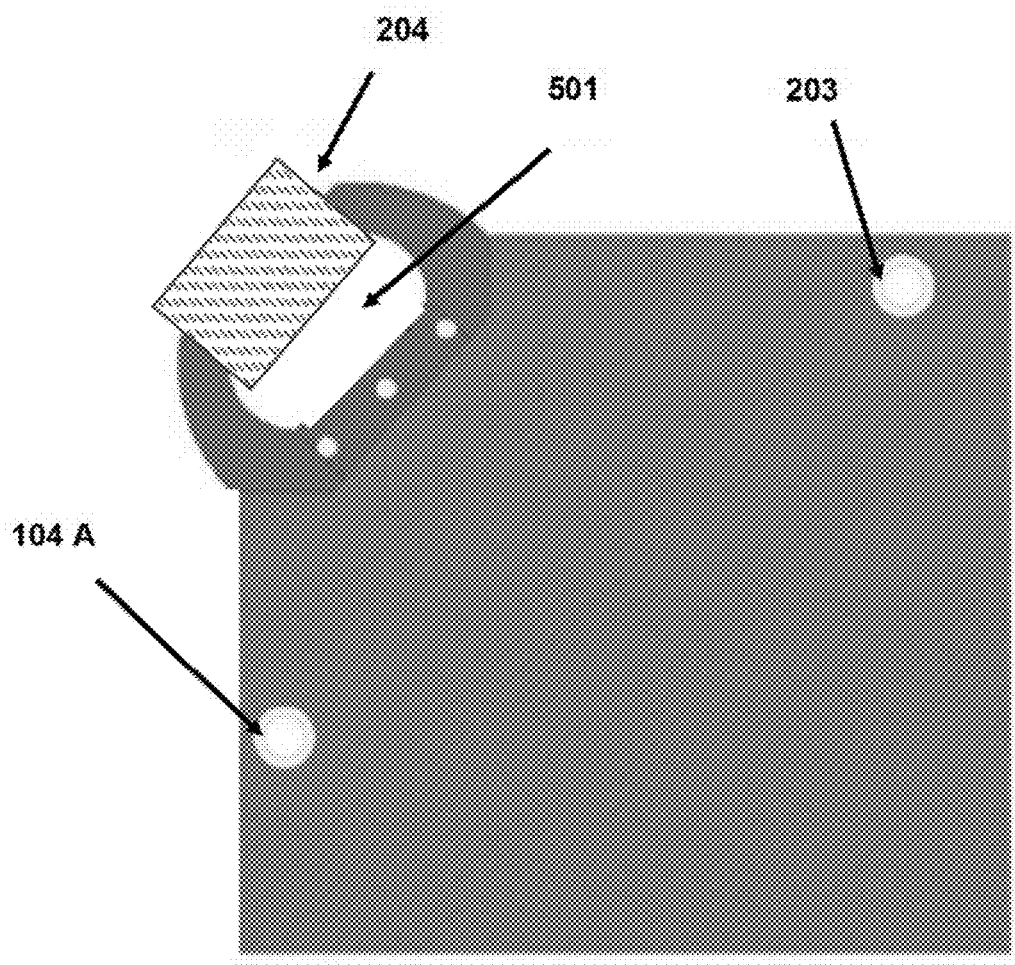
FIG. 3 depicts a view of a gripping handle including a mechanism to weight the load on the gripping handle in accordance with an embodiment.
Figure 4:
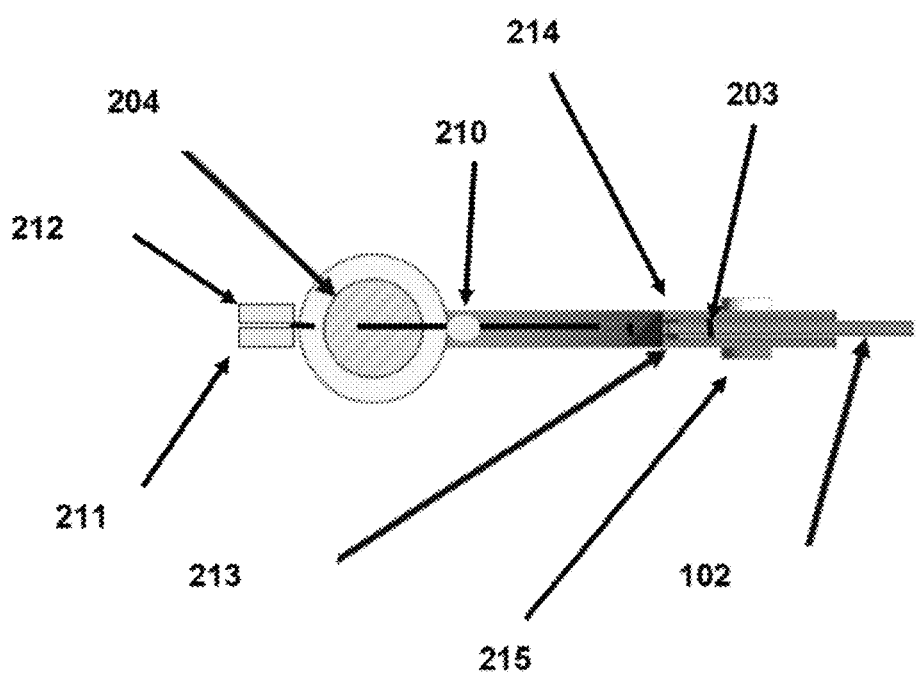
FIG. 4 depicts a view of a gripping handle a hinged mechanism for attaching the handle to the debris collection and portage apparatus in accordance with an embodiment.

In an alternate embodiment, the gripping handles have a substantially round or oval shape with an opening formed therein. The opening is sized to enable a user to fit his/her hand around a portion of the handle for ease in pulling the cloth and debris via the handle. The gripping handles 104 A-D may be made of a plastic, rubber, metal such as aluminum or steel, or wood material. The handles 104 A-D may be also designed to have a weight 204 attached to the handle 104 to provide wind resistance for the weather-resistant cloth 102. As shown in FIGS. 3 and 4 added weight 204 can be formed in the style of a clam shell to attached to the gripping handles 104 A-D. However, any removable means for attaching the weight could be used such as tie wraps, screws, clamps, bolts or rivets. The weight 204 attached to the handle 104 comprises of a hinge 210, a clamp plate 211 and a clamp plate 212. The handle 104 is attached to the weather-resistant cloth 102 through eye/grommet 203 by fastener 215 through support plates 214 and 213 which are used to attached to the weather-resistant cloth 102 to the handle 104.

Figure 5:
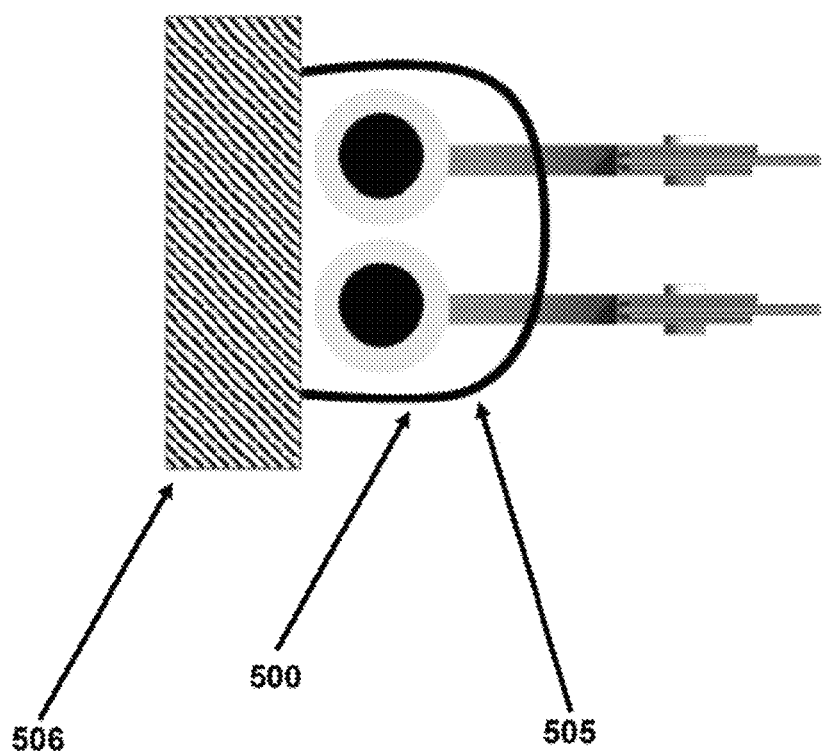
FIG. 5 depicts an Interlock element of a debris collection and portage apparatus according to another embodiment.

The gripping handles 104 A-D each contain an interlock element 600 shown in FIG. 5 which is threaded through handle hole opening 501 and when engaged secures the debris within the weather-resistant cloth 102 for transport or for lifting. Interlock element 500 comprises of cable 505 and grip 506. Alternatively, the handles can be collated to form a single gripping point using a grip 506 that attaches to each of the handles resulting in a single lifting point. The grip 506 can be a clip, hook or ring formed from cable, rope, metal or plastic.

Figure 6:
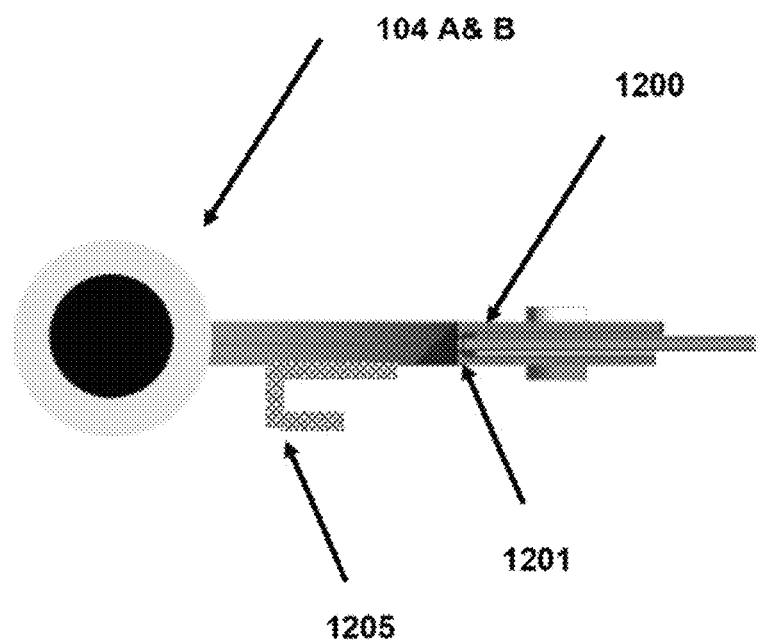
FIG. 6 depicts the interlocking hook of the invention.
Figure 6:
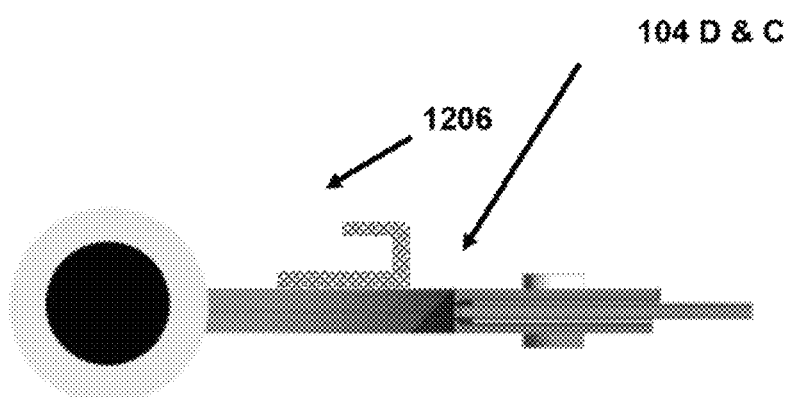

As shown in FIGS. 2, 5 and 6, the at least three gripping handle 104 that have a substantially round shape having an opening 501 formed therein; however, the configuration shown in FIGS. 2 and 6 is not limited thereto and FIG. 1 shows four gripping handles 104 A-D. Specifically, referring to FIG. 1, opening 501 in 104A and 104B are sized such that 104C and 104D can pass through the opposing gripping handle. For example, in other configurations, the gripping handle may be, for example, oval, oblong, or square. The gripping handle may be fixable attached to a corner of the cloth 102 via stitching (not shown), fastener 215 which can be rivets, bolt or screw, or adhesive (not shown) and/or other means of securing the handle to the cloth. The gripping handle further includes an interlock element 500 that, in a non-limiting embodiment shown in FIG. 5, is disposed in a central area of the handle portion that is attached to the cloth 102. It will be understood that the location of the interlock element is not limited to this section of the gripping handle. All that is required is that the interlock elements of each gripping handle 104A-104D be located at the corresponding handles such that when the cloth is folded over, lengthwise and/or widthwise, the interlock elements align up to interconnect and secure the debris within the folded cloth 102.

Figure 7:
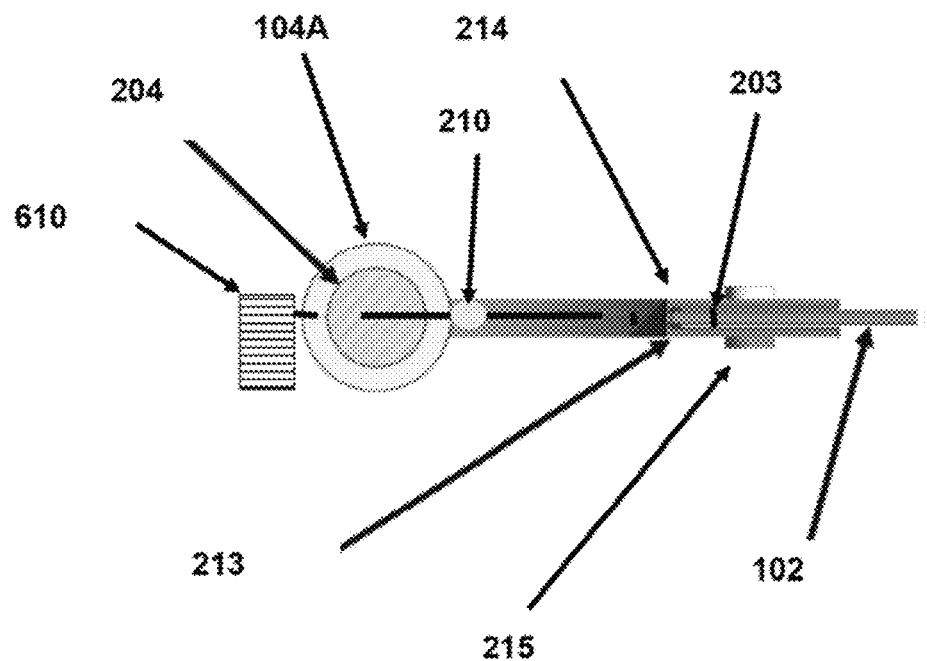
FIG. 7 depicts the magnetic attachment for the handle of the invention.
Figure 7A:
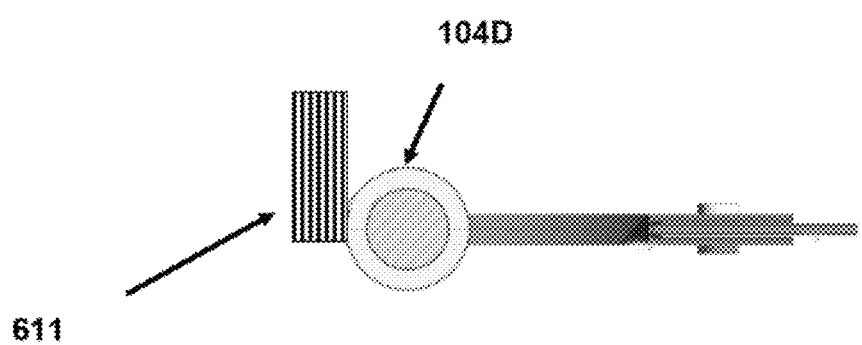
FIG. 7A depicts the steel plate attachment for the opposing handle of the invention.
Figure 16:
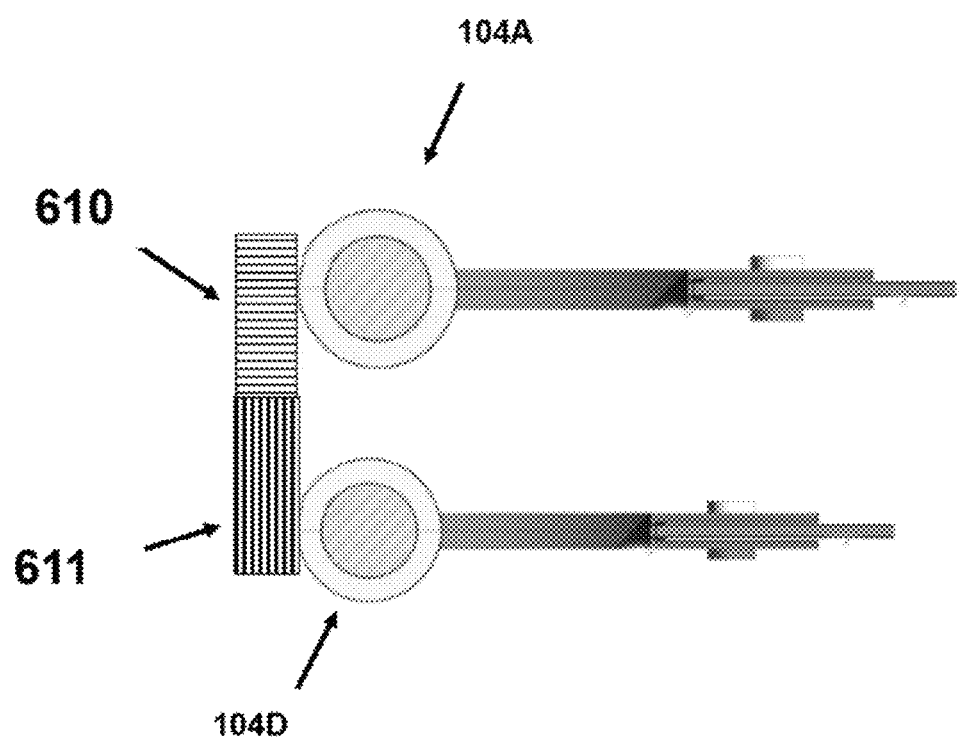
FIG. 16 depicts the magnetic attachment for the handle of the invention.

In an embodiment, as shown in FIG. 7, FIG. 7A and FIG. 16 each of the gripping handles 104A-104D may include a magnet or magnetic materials 610 and steel plates 611 used to secure said gripping handles 104A-104D attached to the corners of the cloth 102. The magnets or the steel plates may be embedded in or affixed to each of the gripping handles 104A-104D. Additionally, the handles can be configured such that the first and second gripping handles 104A and 104B contain opposing magnets and the third and fourth gripping handles 104C and 104D also contain opposing magnets. The magnets are configured to further secure the gripping handles to corresponding other gripping handles thereby eliminating a need for the interlock element 500 when cloth 102 is folded over such that first and second gripping handles 104A and 104B with said magnet material 610 and the third and fourth gripping handles 104C and 104D with said steel plates 611.

Figure 8:
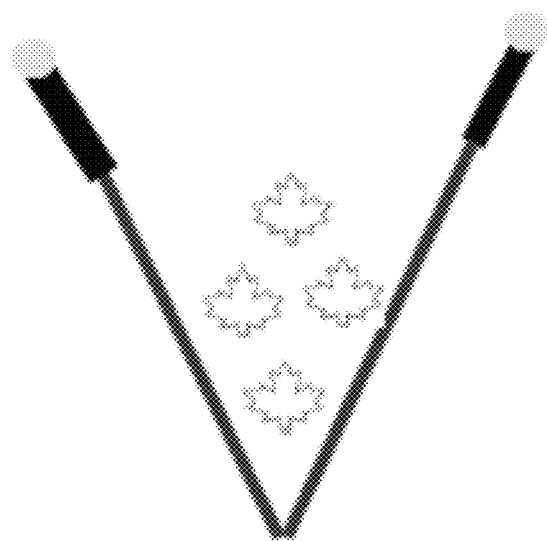
FIG. 8 depicts the invention folded to carry debris.
Figure 9:
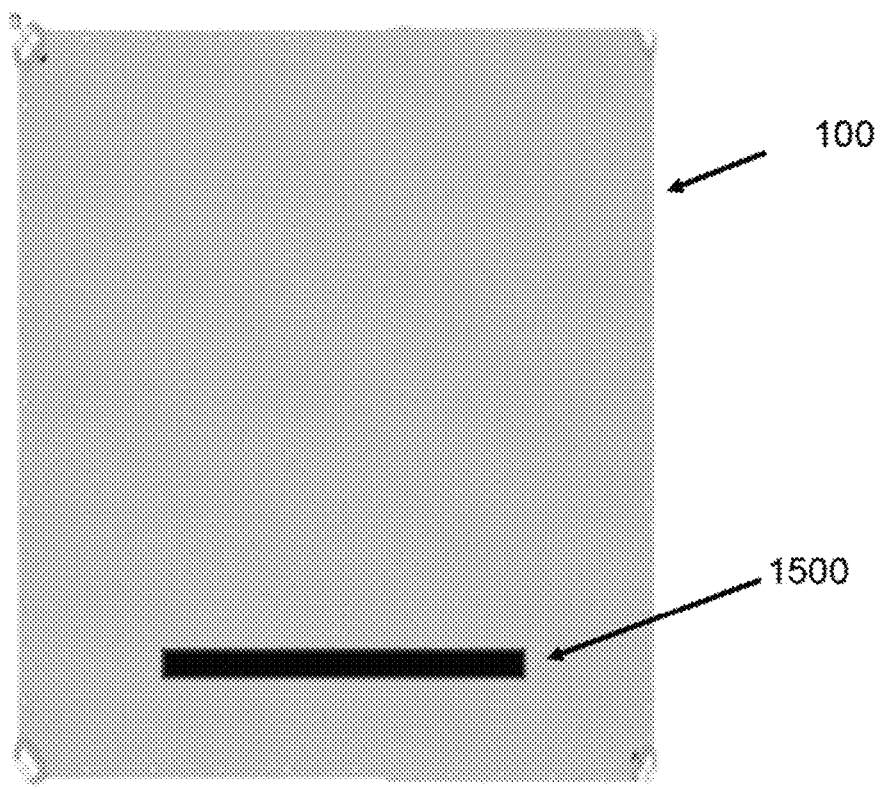
FIG. 9 depicts the invention with a pocked to attach wheels to the invention.

As shown in FIG. 1, FIG. 8 and FIG. 9, a first gripping handle 104A is disposed on a first corner of a first edge of the cloth 102 and a second gripping handle 1048 is disposed on a second corner at a second edge of the cloth 102 such that the first gripping handle 104A is configured to interlock, via respective interlocking elements, with the second gripping handle when the cloth 102 is folded lengthwise along a longitudinal axis y, the interlock securing at least a portion of debris contained on the cloth 102.

A third gripping handle 104C is disposed on a third corner of the first edge of the cloth 102 and a fourth gripping handle 104D is disposed on a fourth corner at the second edge of the cloth 102 such that the third gripping handle 104C is configured to interlock, via respective interlocking elements, with the fourth gripping handle 104D when the cloth 102 is folded lengthwise along the longitudinal axis y, the interlock securing a further portion of the debris contained on the cloth 102. FIG. 8 illustrates the cloth 102 once the cloth 102 has been folded along the longitudinal axis y. Interlock element 500 can be used to attach the two handles 104 together or the handles 104 maybe interlocked first gripping handle 104A and second gripping handle 104C such that the gripping handle 104C passes through gripping handle 104A.

The Interlocked third and fourth gripping handles 104C and 104D are configured to combine with interlocked first and second gripping handles 104A, 104B to form a single combined handle 130.

Turning now to FIGS. 1-8 the handles 104A-104D include structures 1200 and 1201 and the interlocking elements of the second and third gripping handles 104B and 104A include optional hooks structures 1205 sized to securely engage with the structures of the interlocking elements of the first and fourth gripping handles 104D and 104C include optional hooks structures 1206.

Figure 10:
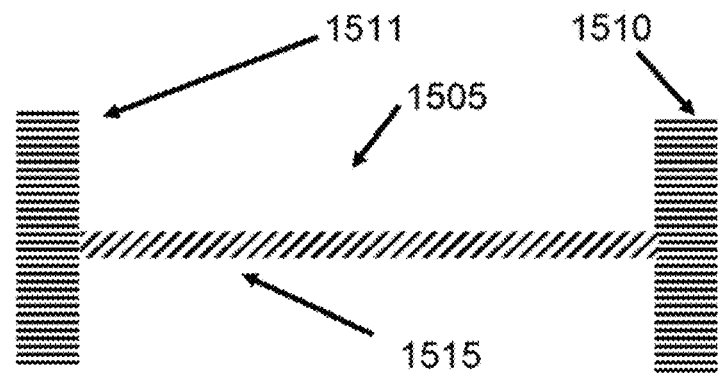
FIG. 10 depicts the wheels to the invention.
Figure 10:
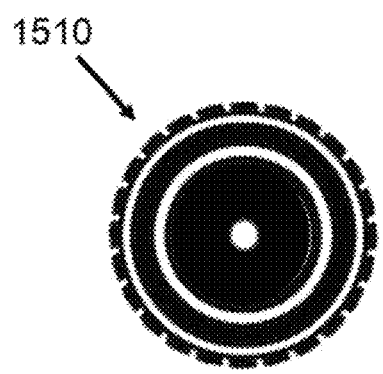
Figure 11:
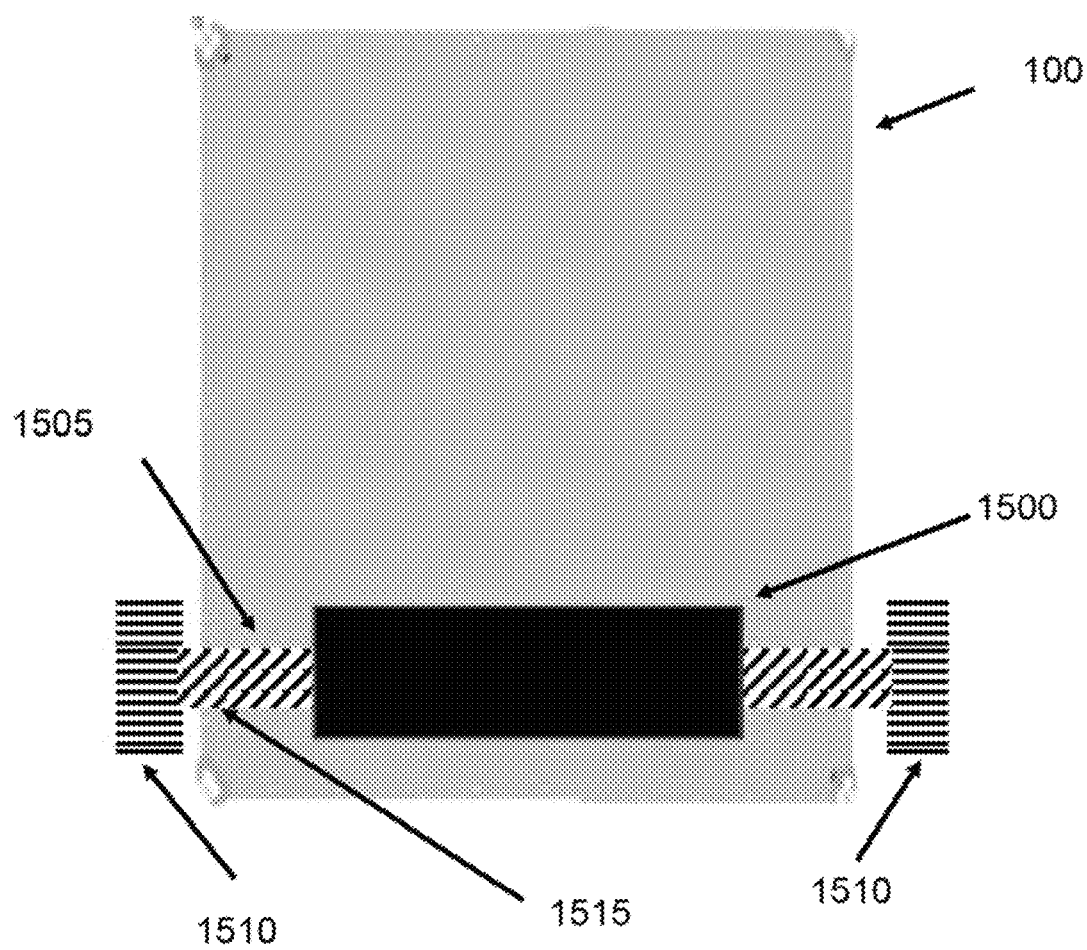
FIG. 11 depicts the invention with a pocket and the wheels of the invention.

Turning to FIGS. 9, 10, 10 A and 11, the debris collection and portage apparatus 100 can be constructed with pocket 1500 which is designed to removably fit wheels (dolly) assembly 1505 such that when wheels assembly 1505 are removably attached to debris collection and portage apparatus 100 the wheels assembly 1505 can facilitate moving the portage apparatus 100. Wheels 1505 comprised of right wheel and hub and left wheel and hub 1511 and shaft 1515 which can be removably attached to portage apparatus 100 using pocket 1500 such that the debris collection and portage apparatus 100 can be easily rolled to an alternative location without requiring the user to carry the debris collection and portage apparatus 100 when loaded. Pocket 1600 can be any other mechanism capable of attaching the shaft 1515 to the portage apparatus 100 such as a bracket or clamp. Alternatively, the portage apparatus 100 can be constructed with two pockets 1500 which is designed to removably fit 2 sets of wheels 1505 such that when wheels 1505 are attached to portage apparatus 100 can be easily rolled to an alternative location without requiring the user to carry the debris collection and portage apparatus 100 when loaded.

Figure 12:
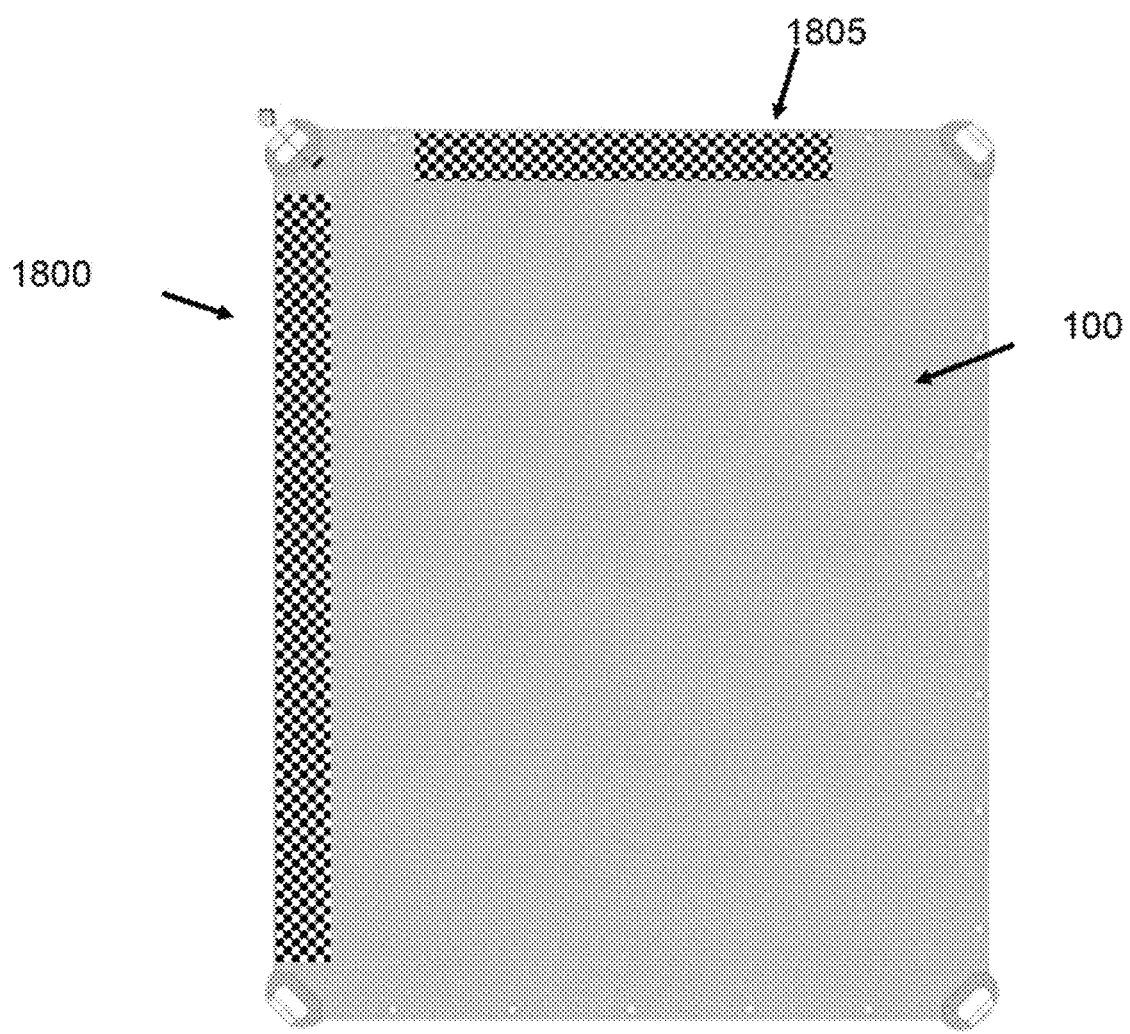
FIG. 12 depicts the invention with dust pan edges.

Turning now to FIG. 12, shows the portage apparatus 100 according to another embodiment of the invention with dust pan style edged liner 1800 and 1805 around perimeter. The edged liner 1800 and 1805 can be arranged such that they are on all 4 sides or only one side.

Figure 13:
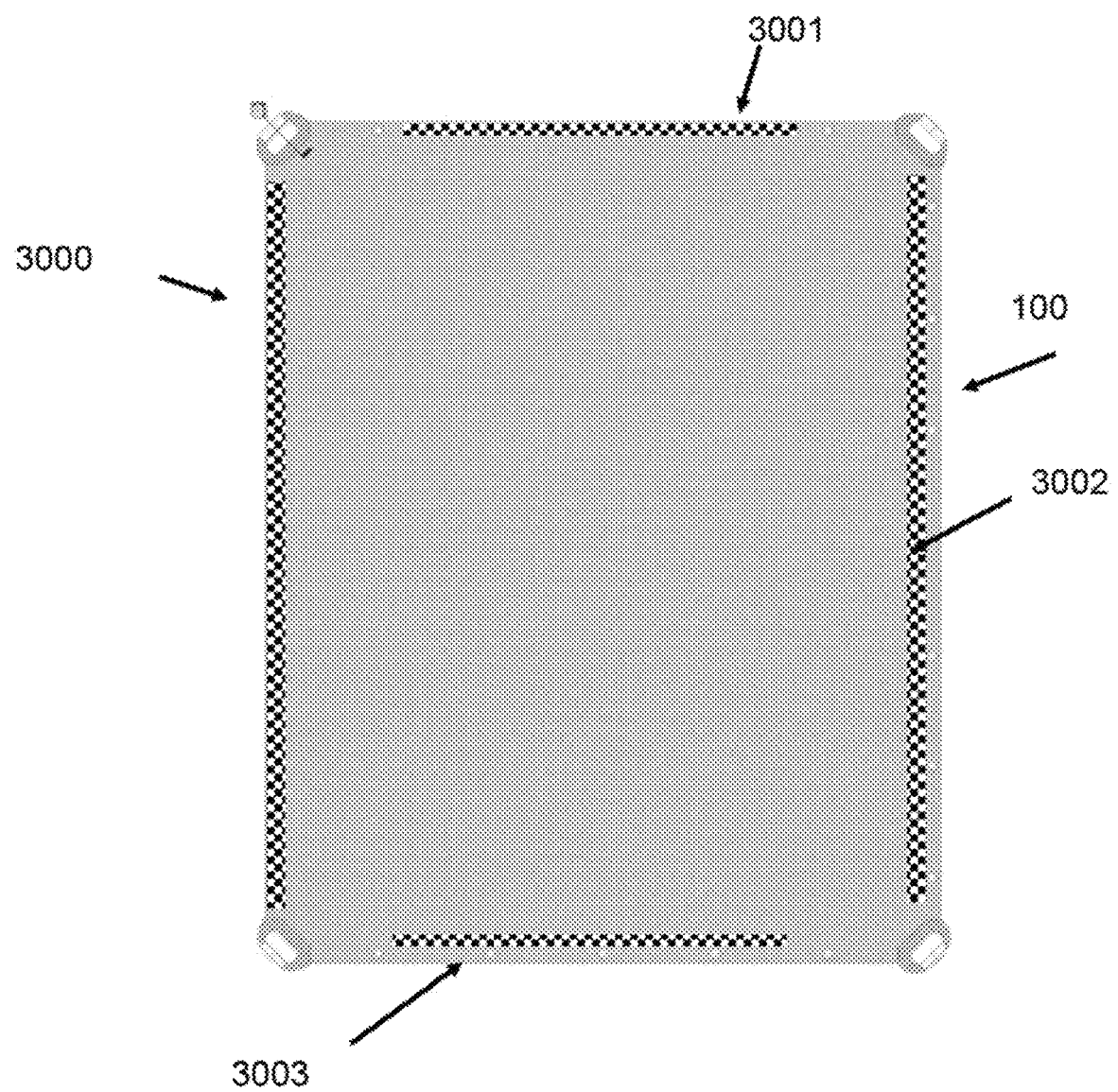
FIG. 13 depicts a plan view of the invention with removable sides.
Figure 14:
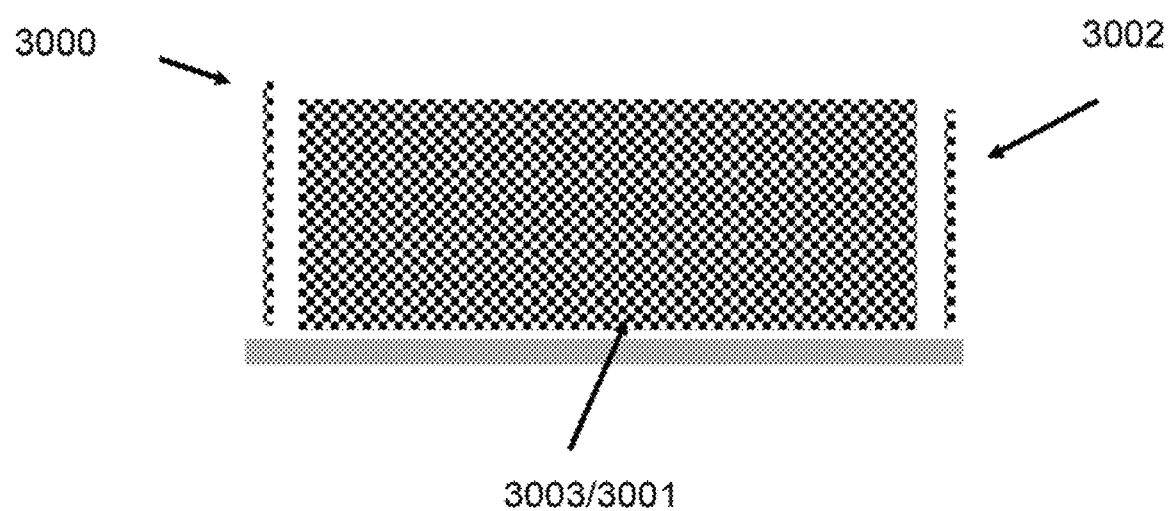
FIG. 14 depicts an elevation view of the invention with removable sides.

Alternatively, the portage apparatus 100 of the invention can also be fitted with removable sides as shown in FIGS. 13 and 14. Removable sides 300, 3001, 3002 and 3003 can be attached to the portage apparatus 100 to form a large tote.

Figure 15:
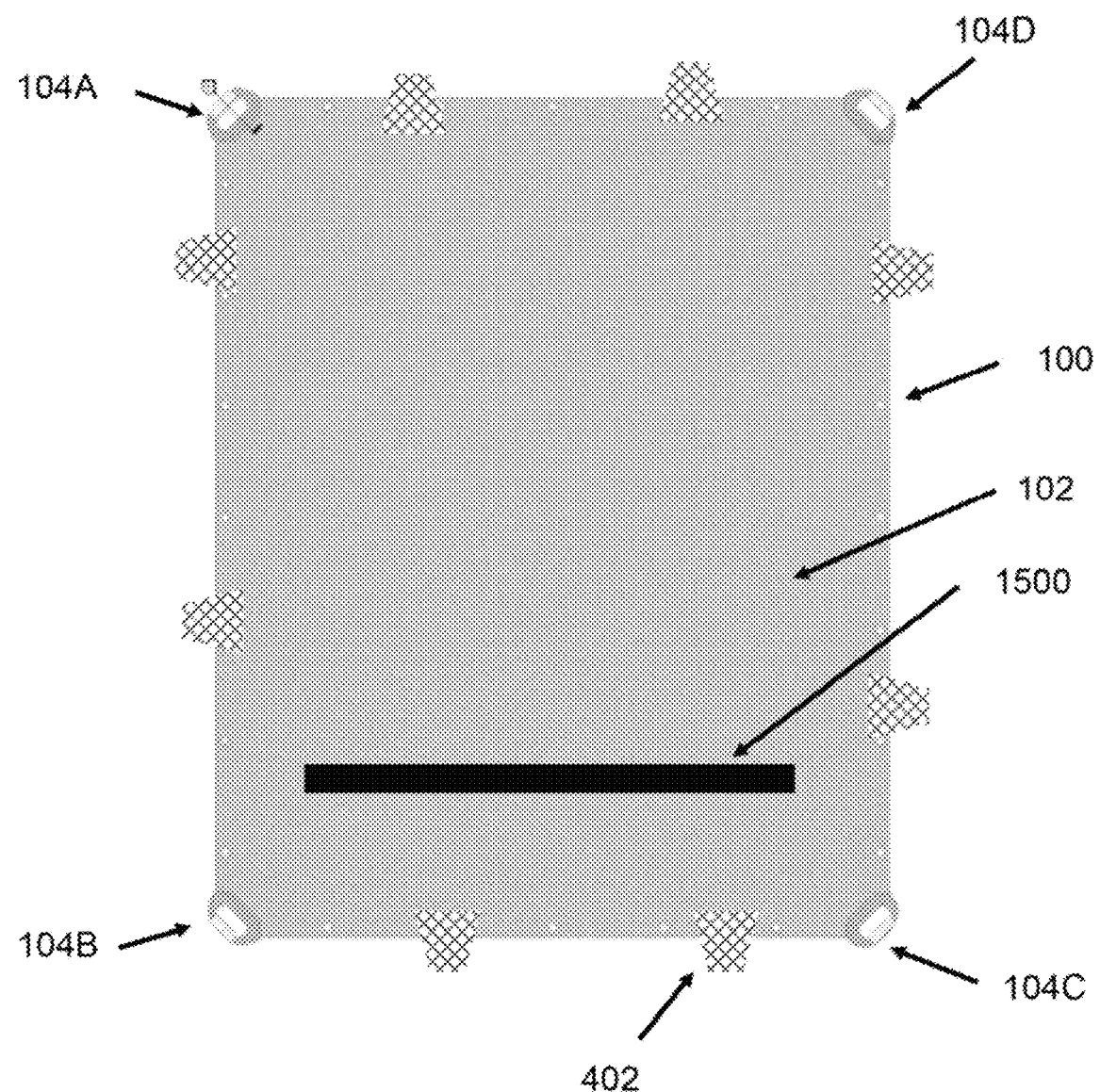
FIG. 15 depict high-level plan views of a debris collection and portage apparatus in accordance with an alternate embodiment.

Turning now to FIG. 15, a debris collection and portage apparatus 100 according to another embodiment will now be described. Like elements are numbered alike among the Figures and will not be described further. In FIG. 4, a weather-resistant cloth 102 includes a plurality of weights 402 dispersed around a periphery of the cloth 102. The weights 402 disposed around edges of the cloth 102 are configured to secure the cloth to a ground surface such that weather- and/or human-associated interference with the cloth 102 is minimized. In embodiments, the weights may be located in portions of the cloth 102 so as not to interfere with the ability to fold the cloth 102 lengthwise and/or widthwise. For example, the weights may be placed at edges of the cloth a predetermined distance from the midpoints of the length and width of the cloth 102. In embodiments, the heaviness of the weights may be selected to correspond to the weight of the cloth. For example, for a cloth 102 weighing 18 OZ and having dimensions of 8'×10', a weight may be disposed at 8" intervals around the cloth periphery and each weighing no more than 10 OZ each.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus for debris collection and portage, comprising of: a weather-resistant cloth having a substantially rectangular shape; at least 4 gripping handles affixed to each of respective corners of the weather-resistant cloth, each of the gripping handles including an interlock element and an opening formed therein, the gripping handles comprising; a first gripping handle disposed on a first corner of a first edge of the cloth and a second gripping handle disposed on a second corner at a second edge of the cloth such that the first gripping handle is configured to interlock, via respective interlocking elements, with the second gripping handle when the cloth is folded lengthwise along a longitudinal axis, the interlock securing at least a portion of debris contained on the cloth and said first gripping handle having a first gripping handle and a magnet and said second gripping handle having a second gripping handle and a steel plate such that said first gripping handle magnet can be in communication with said second gripping handle steel plate when said weather-resistant cloth is folded; a third gripping handle disposed on a third corner of the third edge of the cloth and a fourth gripping handle disposed on a fourth corner at the fourth edge of the cloth such that the third gripping handle is configured to interlock, via respective interlocking elements, with the fourth gripping handle when the cloth is folded lengthwise along the longitudinal axis, the interlock securing a further portion of the debris contained on the cloth and said third gripping handle having a third gripping handle and a magnet and said fourth gripping handle having a fourth gripping handle and a steel plate such that said third gripping handle magnet can be in communication with said fourth gripping handle steel plate when said weather-resistant cloth is folded; and said first gripping handle and said second gripping handle, and said third gripping handle and said fourth gripping handle forming transport handle created by the interlocked said first gripping handle, said second gripping handle, said third gripping handle and said fourth gripping handle; and said debris collection and portage apparatus having eyes/grommets on said first, second, third and fourth edges; and said the debris collection and portage apparatus having a wheels attachment pocket to removably attach a wheels assembly; said wheels assembly comprised of a right wheel and a left wheel connected by a shaft which can be removably attached to said portage apparatus using said wheels attachment pocket; said wheels assembly attached to debris collection and portage apparatus the wheels assembly can facilitate moving the portage apparatus.

2. The gripping handle of claim 1, wherein the gripping handle has a load measuring indicator.

3. The load measuring indicator of claim 2 being selected from the group consisting of a spring weight indicator and a load cell indicator.

4. The gripping handle of claim 1, wherein the handle has a weight.

5. The apparatus of claim 1, wherein interlocked third and fourth gripping handles are configured to combine with interlocked first and second gripping handles to form a single combined handle.

6. The apparatus of claim 1, the interlocking elements of the first and fourth gripping handles include raised structures and the interlocking elements of the second and third gripping handles include recessed structures sized to engage with the raised structures of the interlocking elements of the first and fourth gripping handles.

7. The apparatus of claim 1, further comprising magnetics embedded in or affixed to each of the gripping handles, wherein the first and second gripping handles contain opposing magnets and the third and fourth gripping handles contain opposing magnets.

8. The apparatus of claim 1, further comprising a hook embedded in or affixed to each of the gripping handles, wherein the first and second gripping handles contain opposing hooks and the third and fourth gripping handles contain opposing hooks that are in communication with the hooks of said first and second gripping handle when said weather-resistant is folded lengthwise along a longitudinal axis.

9. The apparatus of claim 1, wherein the weather-resistant cloth is selected from the group consisting of plastic, thread, synthetic resin, and rubber.

10. The apparatus of claim 1, wherein the weather-resistant cloth has a width between 4'-20' and a length between 0.6'-30'.

11. The apparatus of claim 1, further comprising magnetic material disposed around at least a portion of edges of the weather-resistant cloth.

12. The apparatus of claim 1, wherein the gripping handles are affixed to the weather-resistant cloth via at least one of stitching and rivets.

13. The apparatus of claim 1, wherein the gripping handles are comprised of a rubber material.

14. The apparatus of claim 1, wherein corners of the weather-resistant cloth are cut at substantially 45-degree angles and a width of the gripping handles correspond in size to a length of the cut in the weather-resistant cloth.

* * * * *